United States Patent Office 3,081,912
Patented Mar. 19, 1963

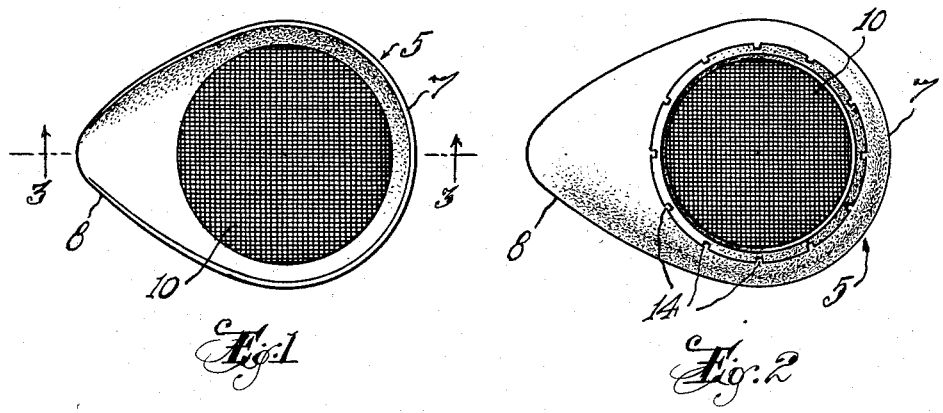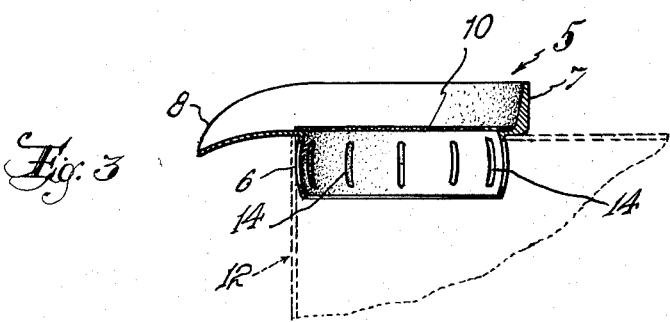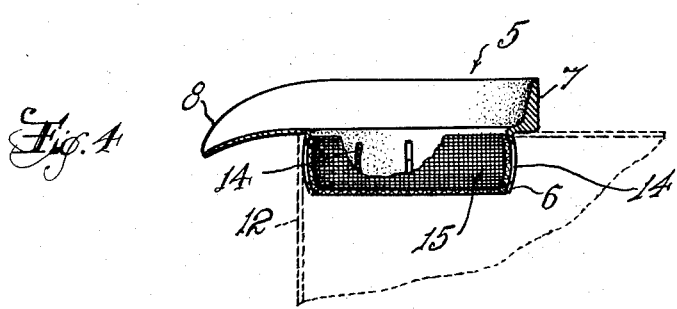

3,081,912
COMBINATION POURING SPOUT AND STRAINER
Anthony J. Goceliak, 32 Cottage St., Jersey City, N.J.
Filed Mar. 1, 1960, Ser. No. 12,113
1 Claim. (Cl. 222—189)

This invention relates to a combination pouring spout and strainer.

The device herein-disclosed is intended to be inserted into the container, to filter or strain a liquid poured therefrom, and also to provide a suitable pouring spout or lip.

The device, which is intended for repeated usage, comprises a body portion adapted to be seated on top of a container, which body portion includes an upstanding flange of substantial height, to avoid overflow of liquid, and said flange is formed into a pouring lip or spout. The larger part of the body portion is preferably circular, to avoid corners, for cleaning purposes, and the inner surface of the body is preferably inclined downwardly to an opening in the body through which the poured liquid of the container flows.

To hold said body portion in a container, I provide an annular retaining means, which depends from the body portion, and is resilient, and has a convex outer surface, spaced vertical slots being preferably formed in the retaining means to aid in its insertion into the opening of a container, it being understood that the resilient retaining means is normally of slightly greater diameter than the opening in the container.

The drawings illustrate the invention, and in these:

FIGURE 1 is a plan view of one form of the invention;

FIG. 2 is a bottom plan of FIG. 1;

FIG. 3 is a vertical section on line 3—3 of FIG. 1; and

FIG. 4 is a section, similar to FIG. 3 but shows a modified form and disposition of the filtering screen.

Referring to the drawings for a detailed description, and at first to FIGS. 1–3, the numeral 5 indicates the body portion of the device, from which depends an annular, resilient, retaining means 6. The body includes an upstanding flange 7 of substantial depth, to reasonably avoid overflow of liquid from a container, said flange tapering to a pouring spout or lip 8. There is an opening in the bottom of said body, over which opening there is a screen or mesh filter 10. Said body is peripherally curved, and the inner surface of said flange inclines downwardly to said screen, to avoid sharp angles, the easier to be cleaned.

The annular, resilient retaining means 6 depends from the body and has a convex outer surface, as shown, and its outer diameter is slightly larger than the opening of the container 12 into which it is inserted. Being resilient, the retaining means may be compressed sufficiently for insertion, whereupon the convex curvature holds the device to the container, due to the subsequent expansion and the convex outer surface. To aid in the compression while inserting, spaced slots 14 are made in and extend around the retaining means.

In FIG. 4, I show a modification of the screen or mesh filter, the structure of the device otherwise being as shown and described for FIGS. 1–3. In FIG. 4, the screen filter 15 is cup-shaped, and is positioned within the retaining means, and closes the opening thereof at the lower end, and also covers the mentioned slots.

What is claimed is:

A combination filter and spout for insertion into, and support by, a container having an opening in its top, consisting of a flat bottom portion having a circular opening therein, a curved, outward extension of said bottom portion dropping outwardly from the level of the same and tapering to form a spout, a single upstanding flange located around the edge of the combined bottom portion and extension, the height of said flange being uniform above said bottom portion but shortening down on both sides of the extension to the end thereof, and a circular, resilient retaining flange vertically slotted at intervals and depending from said bottom portion at the periphery of said circular opening, the outer and inner surfaces of said retaining flange being respectively convexly and concavely curved from the upper to the lower edge, a removable cup-shaped screen filter retained within said flange, said cup shape being defined by a flat circular bottom wall having a concavo-convex upstanding wall therearound, the outer convex portion of said upstanding wall fitting the inner concave surface of said depending flange and thereby being self-retained within said depending flange due to its form.

References Cited in the file of this patent
UNITED STATES PATENTS

| | | |
|---|---|---|
| 1,120,313 | Kessler | Dec. 8, 1914 |
| 1,457,614 | Brown | June 5, 1923 |
| 1,712,203 | Gadsden et al. | May 7, 1929 |
| 2,168,607 | O'Brien | Aug. 8, 1939 |
| 2,471,189 | Bartels | May 24, 1949 |